United States Patent
Dadheech et al.

(10) Patent No.: US 9,861,974 B2
(45) Date of Patent: Jan. 9, 2018

(54) FILM SYSTEM

(71) Applicant: GM GLOBAL TECHNOLOGY OPERATIONS LLC, Detroit, MI (US)

(72) Inventors: Gayatri V. Dadheech, Bloomfield Hills, MI (US); Thomas A. Seder, Northville, MI (US); James A. Carpenter, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/245,905

(22) Filed: Aug. 24, 2016

(65) Prior Publication Data

US 2017/0056871 A1 Mar. 2, 2017

Related U.S. Application Data

(60) Provisional application No. 62/212,127, filed on Aug. 31, 2015.

(51) Int. Cl.
| | |
|---|---|
| *B01J 37/34* | (2006.01) |
| *B01J 31/38* | (2006.01) |
| *B01J 35/00* | (2006.01) |
| *B01J 31/12* | (2006.01) |
| *F01N 3/00* | (2006.01) |

(52) U.S. Cl.
CPC ........... *B01J 37/344* (2013.01); *B01J 31/127* (2013.01); *B01J 31/38* (2013.01); *B01J 35/004* (2013.01); *F01N 3/00* (2013.01)

(58) Field of Classification Search
CPC ........ B01J 37/34; B01J 37/344; B01J 31/127; B01J 31/38; B01J 35/004; F01N 3/00
USPC ............................................................ 502/5
See application file for complete search history.

(56) References Cited

U.S. PATENT DOCUMENTS

2009/0196791 A1* 8/2009 Ogata .................... B01J 35/004
422/40

\* cited by examiner

*Primary Examiner* — Edward Johnson
(74) *Attorney, Agent, or Firm* — Quinn IP Law

(57) ABSTRACT

A film system includes a substrate and a film disposed on the substrate. The film includes a monolayer formed from a fluorocarbon and a plurality of regions disposed within the monolayer such that each of the plurality of regions abuts and is surrounded by the fluorocarbon. Each of the plurality of regions includes a photocatalytic material. A method of forming a film system includes depositing a monolayer formed from a fluorocarbon onto a substrate. After depositing, the method includes ablating the monolayer to define a plurality of cavities therein, wherein each of the plurality of cavities is spaced apart from an adjacent one of the plurality of cavities along the monolayer. After ablating, the method includes embedding a photocatalytic material into each of the plurality of cavities to form a film on the substrate and thereby form the film system.

12 Claims, 2 Drawing Sheets

FILM SYSTEM

CROSS-REFERENCE TO RELATED APPLICATIONS

This application claims the benefit of U.S. Provisional Application No. 62/212,127, filed on Aug. 31, 2015, which is hereby incorporated by reference in its entirety.

TECHNICAL FIELD

The disclosure relates to a film system and to a method of forming the film system.

BACKGROUND

Devices, such as display systems, are often designed to be touched by an operator. For example, a vehicle may include a display system that presents information to an operator via a touchscreen. Similarly, an automated teller machine or kiosk may include a display system that is activated by touch.

Other devices, such as cameras and eyeglasses, generally include a lens surface which may be inadvertently touched by an operator during use. Further, other devices such as vehicles, windows, mirrors, appliances, cabinetry, furniture, cellular telephones, fingerprint scanners, sensors, copiers, medical instruments, and countertops may also include one or more surfaces which may be touched by an operator. Therefore, during use, an operator may deposit fingerprints and/or oils onto such devices and surfaces.

SUMMARY

A film system includes a substrate and a film disposed on the substrate. The film includes a monolayer formed from a fluorocarbon and a plurality of regions disposed within the monolayer such that each of the plurality of regions abuts and is surrounded by the fluorocarbon. Each of the plurality of regions includes a photocatalytic material.

A method of forming a film system includes depositing a monolayer formed from a fluorocarbon onto a substrate. After depositing, the method includes ablating the monolayer to define a plurality of cavities therein. Each of the plurality of cavities is spaced apart from an adjacent one of the plurality of cavities along the monolayer. After ablating, the method includes embedding a photocatalytic material into each of the plurality of cavities to form a film on the substrate and thereby form the film system. The film includes a plurality of regions including the photocatalytic material and disposed within the monolayer such that each of the plurality of regions abuts and is surrounded by the fluorocarbon.

A method of forming a film system includes concurrently chemisorbing a fluorocarbon and a functionalized photocatalytic material onto a substrate to form a film chemically bonded to the substrate and thereby form the film system. The film includes a monolayer formed from the fluorocarbon and a plurality of regions each formed from the functionalized photocatalytic material and each disposed within the monolayer such that each of the plurality of regions abuts and is surrounded by the fluorocarbon.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
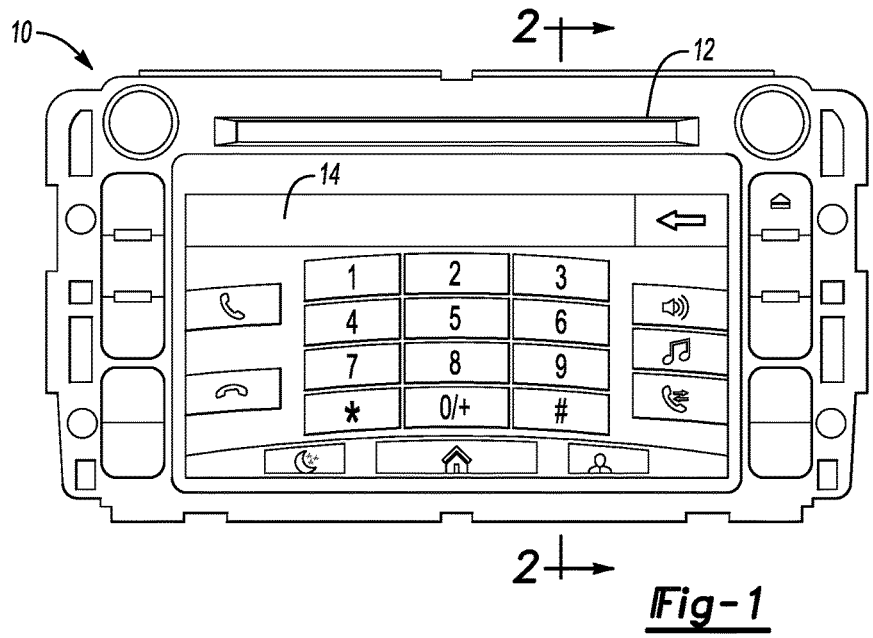
FIG. 1 is a schematic illustration of a front view of a film system.

Referring to the Figures, wherein like reference numerals refer to like elements, a film system 10 is shown generally in FIG. 1. The film system 10 may be suitable for applications in which an operator may touch and deposit fingerprints, oils, and/or other organic or carbon-based contaminants or pathogens onto a screen, lens, or surface. More specifically, the film system 10 may be useful for applications requiring a clean, substantially fingerprint-free screen, lens, or surface. That is, the film system 10 may be useful for removing fingerprints and other organic contaminants from such screens, lenses, or surfaces.

For example, the film system 10 may be useful for automotive applications such as in-dash navigation systems which include a touchscreen, or vehicle cameras which include a lens. Alternatively, the film system 10 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

Figure 2:
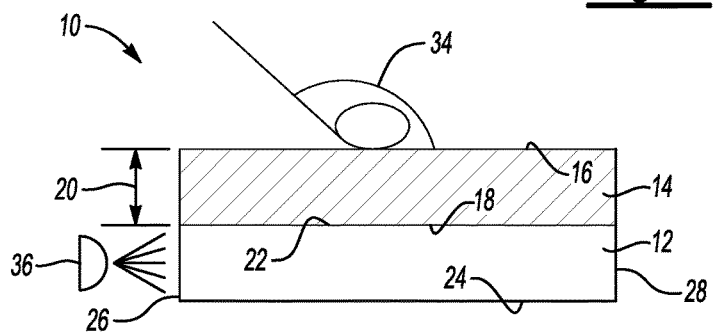
FIG. 2 is a schematic illustration of a cross-sectional view of the film system of FIG. 1 taken along section line 2-2.

Referring now to FIG. 2, the film system 10 includes a substrate 12. The substrate 12 may be formed from a vitreous, transparent material suitable for refracting visible light. For example, in one embodiment, the substrate 12 may be formed from silicon dioxide. In another example, the substrate 12 may be formed from a polycarbonate or other plastic. The substrate 12 may be configured as, by way of non-limiting examples, a screen of a display system, a lens of eyeglasses or goggles, a visor of a helmet, a surface of a refrigerator, a face of a cabinet, a door panel of a vehicle, a touchscreen of a kiosk, or as any other surface or device that may be touched by an operator.

The film system 10 also includes a film 14 disposed on the substrate 12, e.g., chemically bonded to the substrate 12 as set forth in more detail below. The film 14 may be configured to cover and protect the substrate 12 from fingerprints, oils, and organic contaminants. That is, the film 14 may be configured to cause fingerprints, oils, and organic contaminants deposited on the film 14 to vanish, disappear, or vaporize so as to maintain a clean substrate 12 that is capable of displaying crisp images or reflections.

More specifically, as described with reference to FIG. 2, the film 14 may have a first surface 16 and a second surface 18 spaced opposite the first surface 16. The second surface 18 may abut the substrate 12, and the first surface 16 may be substantially free from squalene, organic material, and/or other oils of fatty acids. As used herein, the terminology squalene refers to an organic compound having 30 carbon atoms and represented by the International Union of Pure and Applied Chemistry name (6E,10E,14E,18E)-2,6,10,15, 19,23-hexamethyltetracosa-2,6,10,14,18,22-hexaene. In general, the film 14 may be characterized as a thin film and may have a thickness 20 of, for example, from 10 μm to 150 μm.

The substrate 12 also has a proximal surface 22 abutting the second surface 18 and a distal surface 24 spaced opposite the proximal surface 22. Therefore, the substrate 12 and the film 14 are configured to transmit visible light through the proximal surface 22, the distal surface 24, the first surface 16, and the second surface 18. The substrate 12 also has a first edge 26 connecting the proximal surface 22 and the distal surface 24, and a second edge 28 spaced opposite the first edge 26.

Figure 3:
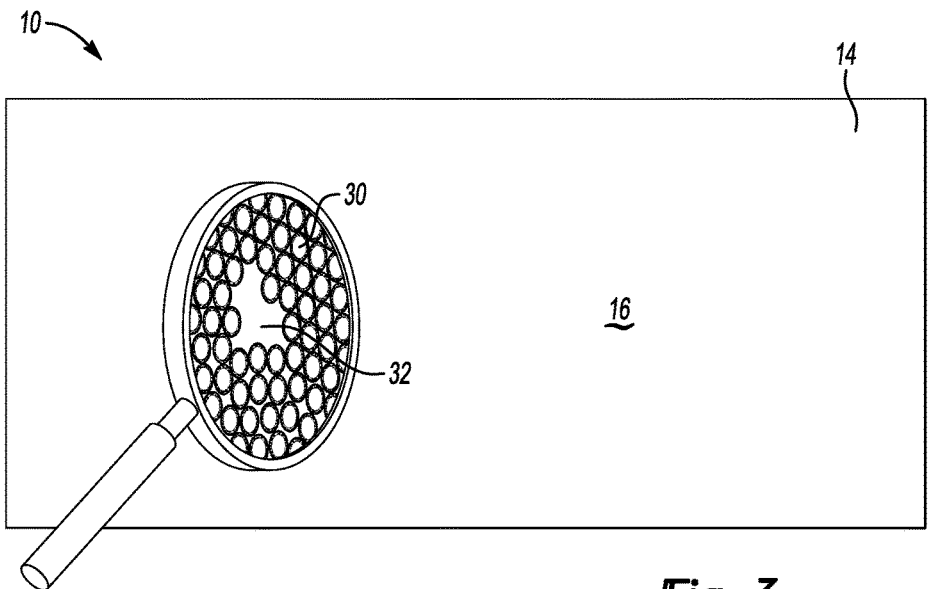
FIG. 3 is a schematic illustration of a top view of a magnified portion of the film system of FIG. 2.
Figure 5:
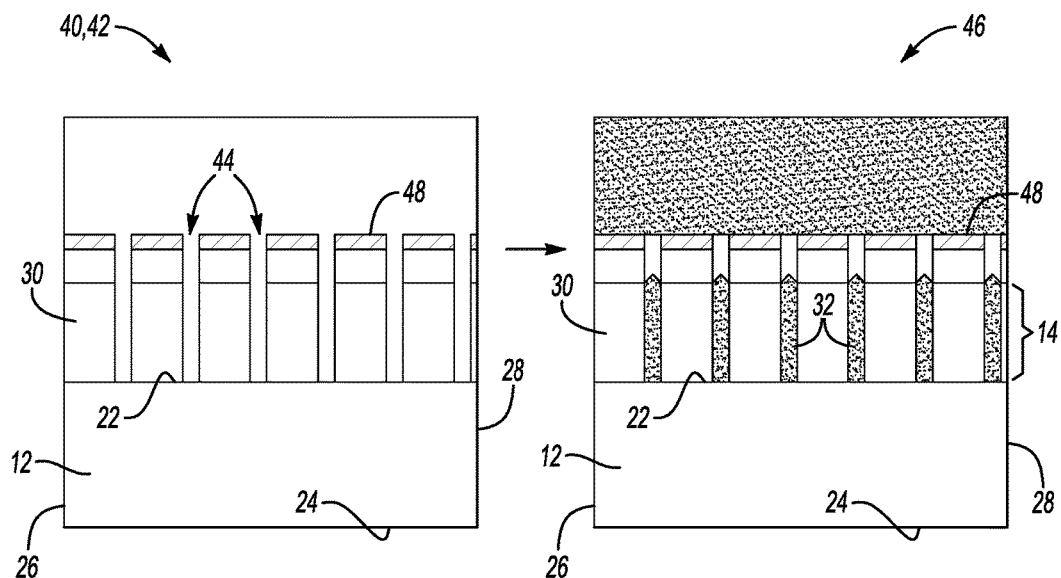
FIG. 5 is a schematic illustration of portions of the method of FIGS. 4.

Referring now to FIGS. 3 and 5, the film 14 includes a monolayer 30 formed from a fluorocarbon. The fluorocarbon may be any suitable material, such as, but not limited to a fluorocarbon polymer, organosiloxane, a fluorinated organosiloxane, and combinations thereof. As best shown in FIG. 3, the monolayer 30 may form a majority of the film 14 and may be characterized as a monolayer field. As used herein, the terminology monolayer refers to a layer having a thickness 20 (FIG. 2) of one molecule. That is, the monolayer 30 is one molecule thick and may be characterized as a thin layer.

As shown in FIG. 3, the film 14 also includes a plurality of regions 32 disposed within the monolayer 30 such that each of the plurality of regions 32 abuts and is surrounded by the fluorocarbon. That is, the plurality of regions 32 are situated within and along the monolayer 30. In one embodiment, the plurality of regions 32 may be equally spaced apart from each other along the first surface 16. In other embodiments, the plurality of regions 32 may be randomly spaced throughout the monolayer 30 along the first surface 16. In still other embodiments, the plurality of regions 32 may be arranged in a pattern within the monolayer 30. The plurality of regions 32 may be present in the film 14 in an amount of from about 10 parts by volume to about 85 parts by volume based on 100 parts by volume of the film 14.

Each of the plurality of regions 32 includes a photocatalytic material, such as titanium dioxide. The photocatalytic material may provide the film 14 with self-cleaning capability. That is, the photocatalytic material may oxidize and/or vaporize any organic material, e.g., squalene, present on the first surface 16 of the film 14, as set forth in more detail below. In particular, the photocatalytic material may be a light-activated photocatalyst upon exposure to, for example, visible or ultraviolet light.

Suitable photocatalytic materials may include, but are not limited to, photo-oxidative semiconductors, semiconducting oxides, doped metal oxides, heterojunction materials, and combinations thereof.

In one embodiment, the photocatalytic material may be titanium dioxide and may be present in the plurality of regions 32 in a rutile form. Alternatively, the photocatalytic material may be titanium dioxide and may be present in the plurality of regions 32 in an anatase form, which may exhibit a comparatively higher photocatalytic activity than the rutile form. In other embodiments, the photocatalytic material may be titanium dioxide and may be present in the plurality of regions 32 as a combination of the rutile form and the anatase form. Further, the photocatalytic material may be doped to form a functionalized photocatalytic material, e.g., functionalized titanium dioxide. For example, the functionalized photocatalytic material may be doped with a metal such as, but not limited to, silver, chromium, cobalt, copper, vanadium, iron, silver, platinum, molybdenum, lanthanum, niobium, and combinations thereof. Alternatively, the functionalized photocatalytic material may be doped with a non-metal such as, but not limited to, nitrogen, sulfur, carbon, boron, potassium, iodine, fluorine, and combinations thereof.

The photocatalytic material may be characterized as a nanoparticle and may have an average diameter measureable on a nanometer scale. Alternatively, the photocatalytic material may be characterized as a particle and may have an average diameter measureable on a micrometer scale. Generally, the photocatalytic material may be present in the film 14 in an amount of from about 2 parts by volume to about 35 parts by volume based on 100 parts by volume of the film 14.

In other non-limiting embodiments, the plurality of regions 32 may include a semiconducting oxide such as, but not limited to, zinc oxide, bismuth, tin oxide, and combinations thereof. The semiconducting oxide may be selected to have a band gap separation suitable for a photocatalytic reaction, as set forth in more detail below.

Referring again to FIG. 3, the film 14 defines a contact angle 34 with water of greater than 140°. For example, the film 14 may define a contact angle 34 with water of greater than or equal to 150°. As such, water, oils, and contaminants may effectively bead on and translate across the first surface 16. Stated differently, water, oils, and contaminants may be mobile and effectively translate along the first surface 16.

Referring again to FIG. 3, the film system 10 may further include a light source 36 disposed adjacent the first edge 26 and configured for emitting electromagnetic radiation. For example, the light source 36 may be an ultraviolet light-emitting diode and the electromagnetic radiation may have a wavelength of from 400 nm to 100 nm. Alternatively, the light source 36 may be an incandescent bulb or a visible light-emitting diode and the electromagnetic radiation may have a wavelength of from 740 nm to 380 nm.

Figure 4:
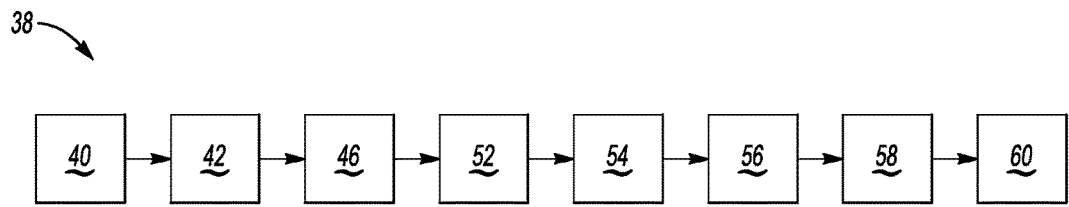
FIG. 4 is a flowchart of one embodiment of a method of forming the film system of FIGS. 1-3.

Referring now to FIGS. 4 and 5, a method 38 of forming the film system 10 is illustrated generally. The method 38 includes depositing 40 the monolayer 30 formed from the fluorocarbon onto the substrate 12. By way of non-limiting examples, depositing 40 may include spraying, rolling, coating, dipping, physical vapor deposition, chemical vapor deposition, molecular layer deposition, atomic layer deposition, and combinations thereof. That is, the monolayer 30 may be deposited in any manner onto the substrate 12 such that the monolayer 30 chemically or physically bonds to the substrate 12. For example, for embodiments in which the fluorocarbon is a perfluoro-organosiloxane and the substrate 12 is formed from silicon dioxide, each molecule of the fluorocarbon may be crosslinked to adjacent molecules of the fluorocarbon and new chemical bonds may be generated at the proximal surface 22 (FIG. 2) as the monolayer 30 is deposited onto the substrate 12.

After depositing 40, the method 38 may include ablating 42 the monolayer 30 to define a plurality of cavities 44 (FIG. 5), wherein each of the plurality of cavities 44 is spaced apart from an adjacent one of the plurality of cavities 44 along the monolayer 30. As non-limiting examples, ablating 42 may include laser ablating, plasma ablating, ultraviolet ablating, and the like. Ablating 42 may remove several molecules of the fluorocarbon monolayer 30 along the proximal surface 22 to define the plurality of cavities 44. Generally, the plurality of cavities 44 may extend from the first surface 16 (FIG. 2) of the film 14 to the second surface 18 (FIG. 2) of the film 14.

After ablating 42, the method 38 may include embedding 46 the photocatalytic material into each of the plurality of cavities 44 to form the film 14 on the substrate 12 and thereby form the film system 10. Therefore, the film 14 includes the plurality of regions 32 including the photocatalytic material and disposed within the monolayer 30 such that each of the plurality of regions 32 abuts and is surrounded by the fluorocarbon. Embedding 46 may include implanting or arranging the photocatalytic material into the monolayer 30 such that the photocatalytic material forms pillars within the plurality of regions 32. For example, embedding 46 may include covering portions of the monolayer 30 with a mask 48 (FIG. 5) such that photocatalytic material is only embedded into the plurality of cavities 44 and is not deposited on top of the monolayer 30. Suitable processes for embedding 46 the photocatalytic material into the plurality of cavities 44 to form the plurality of regions 32 surrounded by the monolayer 30 include, but are not limited to, ion beam deposition, atomic layer deposition, chemical vapor deposition, physical vapor deposition, chemical precipitation, electrophoresis deposition, sputtering, co-sputtering, ion implantation, evaporation, co-evaporation, and pulsed laser deposition.

Figure 6:
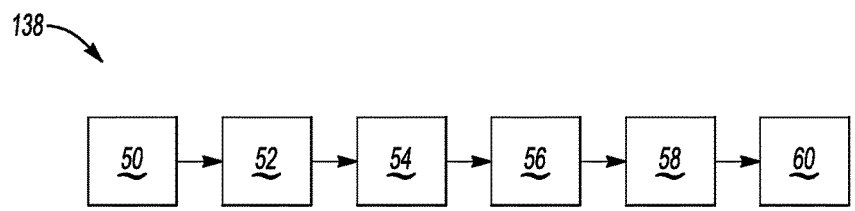
FIG. 6 is a flowchart of another embodiment of the method of forming the film system of FIGS. 1-3.

In another embodiment, the method 138 (FIG. 6) includes concurrently chemisorbing 50 the fluorocarbon and the functionalized photocatalytic material onto the substrate 12 to form the film 14 chemically bonded to the substrate 12 and thereby form the film system 10. The film 14 thus includes the monolayer 30 formed from the fluorocarbon, and the plurality of regions 32 each formed from the functionalized photocatalytic material and each disposed within the monolayer 30 such that each of the plurality of regions 32 abuts and is surrounded by the fluorocarbon. That is, the fluorocarbon and the functionalized photocatalytic material may be deposited onto the substrate 12, simultaneously adsorbed onto the substrate 12, and chemically bonded to the substrate 12. The proximal surface 22 of the substrate 12 may concurrently chemically react with the fluorocarbon and the functionalized photocatalytic material to form the film 14.

After embedding 46 or concurrently chemisorbing 50, the film 14 includes the plurality of regions 32 formed from the photocatalytic material and spaced apart from one another along the first surface 16 (FIG. 2). Such regions 32 may be useful for removing fingerprints from the film 14 so that the film 14 exhibits self-cleaning capability.

More specifically, referring again to FIGS. 4 and 6, the method 38, 138 may further include irradiating 52 the plurality of regions 32 with electromagnetic radiation having a wavelength of from 400 nm to 100 nm, i.e., irradiating 52 the plurality of regions 32 with ultraviolet light. Alternatively, the method 38, 138 may include irradiating 52 the plurality of regions 32 with electromagnetic radiation having a wavelength of from 740 nm to 380 nm, i.e., irradiating 52 the plurality of regions 32 with visible light. That is, the light source 36 (FIG. 2) may be selected to emit electromagnetic radiation having a wavelength tuned to a bandgap of the photocatalytic material to initiate photocatalysis of the squalene deposited as a fingerprint, as set forth in more detail below. As used herein, the terminology bandgap refers to a difference in energy between the highest permitted energy level for an electron in a valence band of the photocatalytic material and the lowest permitted energy level in a conduction band of the photocatalytic material. In other words, the bandgap refers to the minimum amount of light required to make the photocatalytic material electrically conductive.

The method 38, 138 may further include contacting 54 the film 14 and squalene. That is, contacting 54 may include touching the film 14 such that an operator deposits fingerprints, squalene, organic matter, and/or oils onto the first surface 16 (FIG. 2). Oils may include oils of fatty acids and may be synthesized naturally and applied to the film 14 as the operator touches the film 14, or may be applied to the film 14 artificially such as by spraying or coating. Contact between the squalene and the photocatalytic material which is exposed to electromagnetic radiation emitted by the light source 36 may initiate a photocatalytic reaction. More specifically, the photocatalytic material may be a photocatalyst such as titanium dioxide. The photocatalytic reaction may create a strong oxidation agent and breakdown the organic matter, e.g., squalene, to carbon dioxide and water in the presence of the photocatalyst, i.e., the photocatalytic material; electromagnetic radiation, e.g., ultraviolet light; and water, e.g., humidity from ambient conditions. As such, the photocatalytic material not be consumed by the catalytic reaction, but may instead only accelerate the photocatalytic reaction as a non-reactant.

In greater detail, when electromagnetic radiation having a desired wavelength illuminates the photocatalytic material, an electron from the valence band of the photocatalytic material may promote to the conduction band of the photocatalytic material, which in turn may create a hole in the valence band and an excess of negative charge or electron in the conduction band. The hole may assist oxidation and the electron may assist reduction. Generally, the hole may combine with water to produce a hydroxyl radical (.OH). The hole may also react directly with squalene or other organic material to increase an overall self-cleaning efficiency of the film 14. Similarly, oxygen in the ambient environment surrounding the photocatalytic material may be reduced by the electron to form a superoxide ion ($.O_2^-$), which in turn may oxidize the organic material present on the film 14. Therefore, the method 38, 138 may include oxidizing 56 the squalene.

In addition, the hole may become trapped before recombination with the electron. For such situations, the photocatalytic material may be functionalized. For example, the method may include doping titanium dioxide with, for example, palladium or ruthenium. The palladium or ruthenium may act as an electrocatalyst and may increase a transfer of electrons to oxygen molecules, which may in turn lower the occurrence of the recombination of electrons and holes.

Further, organic material that is present on the film 14 at the monolayer 30 rather than in direct contact with the plurality of regions 32 may be in dynamic equilibrium with the first surface 16 (FIG. 2) and may diffuse toward a comparatively higher-energy location on the film 14, i.e., the plurality of regions 32. Therefore, the method 38, 138 may also include diffusing 58 the squalene along the film 14 from the monolayer 30 to at least one of the plurality of regions 32. To improve such diffusion, the light source 36 may be tuned to emit electromagnetic radiation having a wavelength that is tuned to a vibration resonance of the squalene and the fluorocarbon. Such tuning may enable the squalene or fingerprint to wiggle or translate along the monolayer 30 to the plurality of regions 32 where the squalene may undergo the photocatalytic reaction described above. Alternatively or additionally, the film 14 may also be heated, for example by infrared radiation, to further improve diffusion across the monolayer 30 towards the plurality of regions 32.

As such, the method 38, 138 may further include vaporizing 60 the squalene. More specifically, once the squalene contacts the photocatalytic material at the plurality of regions 32, the squalene may be photolyzed into comparatively low vapor pressure-sized pieces or parts, which may vaporize off the film 14 and thereby remove the fingerprint or squalene from the film 14. Therefore, the film system 10 may be characterized as self-cleaning. That is, the film 14 may protect the substrate 12 by removing, e.g., oxidizing 56 and vaporizing 60 the fingerprints, squalene, oils, and/or organic material deposited by the touch of an operator. Consequently, the film system 10 and method 38, 138 may provide excellent aesthetics, cleanliness, and readability for display systems, lenses, sensors, and surfaces.

While the best modes for carrying out the disclosure have been described in detail, those familiar with the art to which this disclosure relates will recognize various alternative designs and embodiments for practicing the disclosure within the scope of the appended claims.

The invention claimed is:

1. A film system comprising:
    a substrate; and
    a film disposed on the substrate and including:
        a monolayer formed from a fluorocarbon; and
        a plurality of regions disposed within the monolayer such that each of the plurality of regions abuts and is surrounded by the fluorocarbon, wherein each of the plurality of regions includes a photocatalytic material.

2. The film system of claim 1, wherein the film has a first surface and a second surface spaced opposite the first surface and abutting the substrate, and further wherein the first surface is substantially free from squalene.

3. The film system of claim 2, wherein the plurality of regions are equally spaced apart from each other along the first surface.

4. The film system of claim 2, wherein the substrate has:
    a proximal surface abutting the second surface;
    a distal surface spaced opposite the proximal surface;
    a first edge connecting the proximal surface and the distal surface; and
    a second edge spaced opposite the first edge; and further including a light source disposed adjacent the first edge and configured for emitting electromagnetic radiation.

5. The film system of claim 4, wherein the electromagnetic radiation has a wavelength of from 400 nm to 100 nm.

6. The film system of claim 4, wherein the electromagnetic radiation has a wavelength of from 740 nm to 380 nm.

7. The film system of claim 1, wherein the film defines a contact angle with water of greater than 140°.

8. The film system of claim 1, wherein the photocatalytic material is titanium dioxide and present in the plurality of regions in a rutile form.

9. The film system of claim 1, wherein the photocatalytic material is titanium dioxide and is present in the plurality of regions in an anatase form.

10. The film system of claim 1, wherein the photocatalytic material is titanium dioxide and is present in the plurality of regions as a combination of a rutile form and an anatase form.

11. The film system of claim 1, wherein the fluorocarbon is a fluorinated organosiloxane.

12. The film system of claim 1, wherein the substrate is formed from silicon dioxide.

* * * * *

UNITED STATES PATENT AND TRADEMARK OFFICE
CERTIFICATE OF CORRECTION

PATENT NO. : 9,861,974 B2  
APPLICATION NO. : 15/245905  
DATED : January 9, 2018  
INVENTOR(S) : Gayatri V. Dadheech et al.

It is certified that error appears in the above-identified patent and that said Letters Patent is hereby corrected as shown below:

In the Specification

Column 4, Line 23, "Referring again to FIG.3" should read --Referring again to FIG.2;--

Column 4, Line 30, "Referring again to FIG.3" should read --Referring again to FIG.2;--

Signed and Sealed this  
Third Day of July, 2018

Andrei Iancu  
*Director of the United States Patent and Trademark Office*